United States Patent
Chauvier et al.

(10) Patent No.: US 9,264,585 B2
(45) Date of Patent: Feb. 16, 2016

(54) ENRICHED DIGITAL PHOTOGRAPHS

(75) Inventors: Laurent Chauvier, Villeneuve-la-Garenne (FR); Olivier Paris, Paris (FR); Nicolas Gaude, Issy les Moulineaux (FR)

(73) Assignee: Cisco Technology Inc., San Jose, CA (US)

( * ) Notice: Subject to any disclaimer, the term of this patent is extended or adjusted under 35 U.S.C. 154(b) by 371 days.

(21) Appl. No.: 13/825,381

(22) PCT Filed: Sep. 22, 2011

(86) PCT No.: PCT/IB2011/054180
§ 371 (c)(1),
(2), (4) Date: May 6, 2013

(87) PCT Pub. No.: WO2012/038924
PCT Pub. Date: Mar. 29, 2012

(65) Prior Publication Data
US 2013/0215226 A1   Aug. 22, 2013
US 2014/0063186 A2   Mar. 6, 2014

(30) Foreign Application Priority Data
Sep. 22, 2010 (EP) .................................... 10306020

(51) Int. Cl.
*G06T 15/00* (2011.01)
*H04N 5/04* (2006.01)
(Continued)

(52) U.S. Cl.
CPC ................ *H04N 5/04* (2013.01); *G11B 27/005* (2013.01); *G11B 27/034* (2013.01); *G11B 27/10* (2013.01); *G11B 27/105* (2013.01); *G11B 27/28* (2013.01); *G11B 27/36* (2013.01); *H04N 13/0051* (2013.01)

(58) Field of Classification Search
CPC .... G11B 27/005; G11B 27/034; G11B 27/10; G11B 27/105; G11B 27/28; G11B 27/36; H04N 5/04; H04N 13/0051
USPC .................... 345/473, 474, 475; 348/43, 512; 382/173; 386/278
See application file for complete search history.

(56) References Cited

U.S. PATENT DOCUMENTS 5,313,305 A   5/1994   Harigaya et al.
6,049,769 A   4/2000   Holmes et al.
(Continued)

FOREIGN PATENT DOCUMENTS

CN    2624323      7/2004
EP    0 381 807 A2  8/1990
WO    WO 02/07481 A2  1/2002

OTHER PUBLICATIONS

Apr. 25, 2012 Transmittal of International Search Report and Written Opinion of International Searching Authority for the captioned application.
(Continued)

*Primary Examiner* — Phu K Nguyen
(74) *Attorney, Agent, or Firm* — Hahn Loeser & Parks LLP

(57) ABSTRACT

A method for enriching digital photographs, the method comprising: receiving a digital photograph and video data captured before a time at which the digital photograph is captured until after said time, wherein the video data comprises a sequence of video frames; processing the digital photograph and the video frames to layer the digital photograph and the video frames into a plurality of layers thereby creating a plurality of video layer sequences; defining an order of the plurality of layers; generating playback guidance, the playback guidance defining how to combine the video layer sequences during playback; and transmitting the order, the video layer sequences and the playback guidance to a display device for playback.

29 Claims, 12 Drawing Sheets

(51) Int. Cl.
*G11B 27/00* (2006.01)
*G11B 27/034* (2006.01)
*G11B 27/10* (2006.01)
*G11B 27/28* (2006.01)
*G11B 27/36* (2006.01)
*H04N 13/00* (2006.01)

(56) References Cited

U.S. PATENT DOCUMENTS

| | | | |
|---|---|---|---|
| 7,034,833 B2* | 4/2006 | Epshteyn | 345/473 |
| 8,487,939 B2* | 7/2013 | Richardson | 345/474 |
| 8,705,861 B2* | 4/2014 | Eaton et al. | 382/173 |
| 8,824,861 B2* | 9/2014 | Gentile et al. | 386/278 |
| 2002/0118287 A1 | 8/2002 | Grosvenor et al. | |
| 2003/0222888 A1 | 12/2003 | Epshteyn | |
| 2006/0132604 A1 | 6/2006 | Lao et al. | |
| 2008/0165195 A1 | 7/2008 | Rosenberg | |
| 2008/0259167 A1 | 10/2008 | Richardson | |
| 2009/0324192 A1 | 12/2009 | Ogura et al. | |
| 2010/0189357 A1 | 7/2010 | Robin et al. | |

OTHER PUBLICATIONS

Xuan Bao et al., "VUPoints: Collaborative Sensing and Video Recording Through Mobile Phones," *Mobiheld*—09 (Aug. 17, 2009).
Angus Graeme FORBES, "CLASS JMC" (retrieved from the internet Jan. 5, 2010).
Nicolas Gaude et al., "DejaVue," *Wiki-Index* (Jun. 10, 2010).
Sung-Yeol Kim et al., "Three-Dimensional Video Contents Exploitation in Depth Camera-Based Hybrid Camera System" (Sep. 14, 2010).
Jaeseung Ko et al., "2D-To-3D Stereoscopic Conversion: Depth-Map Estimation in a 2D Single View Image," *Proceedings of SPIE*, vol. 6696 (2007).
Gregory F. Pfister, "The Computer Control of Changing Pictures" (Aug. 9, 1974).
Justin Shull, "Loop Video in Flash—Forward, Then Reverse" (Freelancer Technology 2013).
"10 Creative Ways to Use the Accelerometer" (Creative Applications. Net, Jan. 13, 2009).
"2D to 3D Photo and Video Conversion with VisuMotion z.l.i.c.e. 3D" (Apr. 6, 2010).
"Canny Edge Detector," *Wikipedia* (Mar. 29, 2013).
"Circle of Confusion," *Wikipedia* (Mar. 13, 2013).
"Digital Audio Compression Standard (AC-3, E-AC-3), revision B" (Advanced Television Systems Committee, Inc. Jun. 14, 2005).
"Exchangeable Image File Format for Digital Still Cameras: EXIF Version 2.2," JEITA CP-3451 (Japan Electronics and Information Technology Industries Association, Apr. 2002).
"Goniometer (audio)," *Wikipedia* (Jun. 17, 2012).
"How to Make Moving Picture (Just Like Harry Potter!)" (Jul. 15, 2009).
"K-Means Clustering," *Wikipedia* (Mar. 25, 2013).
May 27, 2014 Office Communication in connection with prosecution of EP 11 773 869.0.

* cited by examiner

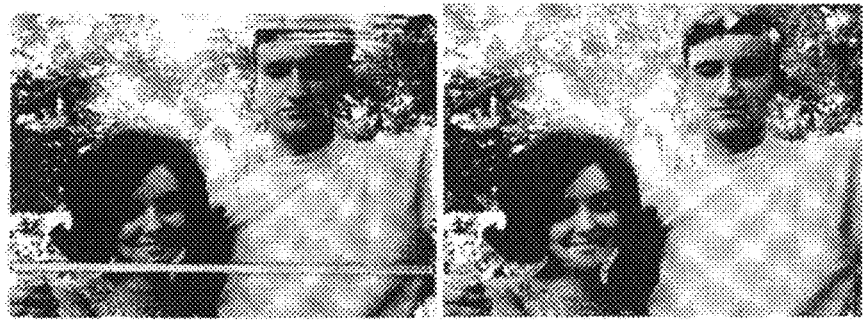
FIG.10a  FIG.10b
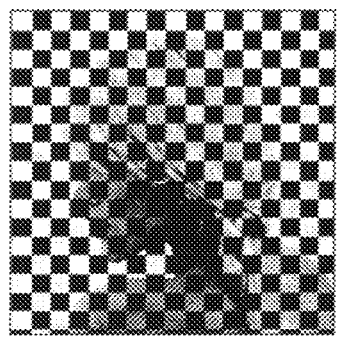 
FIG.11a  FIG.11b
 
FIG.12a  FIG.12b

ENRICHED DIGITAL PHOTOGRAPHS

The present application is a §371 submission of International Application No. PCT/IB2011/054180, which was filed on 22 Sep. 2011, which was published in the English language on 29 Mar. 2012 with publication number WO 2012/038924 A2, and which claims the benefit of the filing date of EP 10306020.8, filed 22 Sep. 2010.

FIELD OF THE INVENTION

The present invention relates to methods and apparatus for enriching digital photographs.

BACKGROUND OF THE INVENTION

The meanings of certain acronyms and abbreviations used herein are given in Table 1.

TABLE 1

Acronyms and Abbreviations

| | |
|---|---|
| 0D | Zero Dimension |
| 1D | One Dimension |
| 2D | Two Dimension |
| 3D | Three Dimension |
| AV | Audio Video |
| EXIF | Exchangeable Image File Format |
| HD | High Definition |
| JPEG | Joint Photographic Experts Group |
| RAW | RAW image file |
| TIFF | Tagged Image File Format |
| TV | Television |
| XML | eXtensible Markup Language |

The emergence of digital photography has developed new ways of consuming photographic media. Photographic paper is no longer the preferred way to consume photos. More and more people are now viewing their photos on electronic devices such as computers, netbooks, electronic tablets, electronic picture frames or even smartphones. However, the capabilities of those electronic screens are largely underused. Indeed, these devices commonly display still pictures or slideshows whereas they have powerful graphical and computational capabilities that could be used to enrich the media playback experience. Thus, while technology has evolved from black and white to colour and digital, the photography user experience has not really changed. It is still about displaying a still picture.

In an attempt to overcome the aforementioned drawbacks of existing still picture display devices, US patent application 2003/0222888 A1 discloses a method and a device that enable displaying a background image and a foreground object (e.g. a person) in a rest state for some period of time, some or all of the foreground object being then temporarily animated (e.g. the person occasionally winks, smiles or waves). The disclosed method requires several operations for segmenting the foreground object from the background. Indeed, a first operation is to record the background image without the object to be animated (the foreground object) in the scene. Then, the foreground object is recorded while in the scene. The foreground object is recorded at rest, which becomes the default background image displayed most of the time. Then the foreground object is recorded performing some action or actions that will be used to occasionally animate the default foreground image.

SUMMARY OF THE INVENTION

According to a first embodiment of the present invention, there is provided a method for enriching digital photographs, the method including: receiving a digital photograph and video data captured before a time at which the digital photograph is captured until after said time, wherein the video data includes a sequence of video frames; processing the digital photograph and the video frames to layer said digital photograph and the video frames into a plurality of layers thereby creating a plurality of video layer sequences; defining an order of the plurality of layers; generating playback guidance, the playback guidance defining how to combine the video layer sequences during playback; and transmitting the order, the video layer sequences and the playback guidance to a display device for playback.

Further, in accordance with an embodiment of the present invention, the method includes receiving audio data captured before a time at which the digital photograph is captured until after said time, wherein the audio data includes a plurality of audio samples; processing the audio samples by decomposing the audio samples into a plurality of audio sources thereby creating a plurality of audio source sequences; and wherein the playback guidance further defines how to combine the audio source sequences with the video layer sequences, and transmitting further includes transmitting the audio source sequences to a display device for playback.

Still further, in accordance with an embodiment of the present invention, the method further includes: detecting layers that are overlaid by other layers in the plurality of layers; detecting transparent areas in the detected layers, the transparent areas corresponding to zones that are overlaid by other layers; and filling in the transparent areas.

Additionally, in accordance with an embodiment of the present invention, the processing the digital photographs and the video frames includes: detecting edges of a plurality of zones in the digital photograph and the video frames; clustering zones of the plurality of zones into clustered zones; superposing the detected edges and the clustered zones; distorting the clustered zones to match the detected edges thereby creating distorted zones; and layering the digital photograph and the video frames into a plurality of layers, each layer including at least one distorted zone.

Further, in accordance with an embodiment of the present invention, the defining an order of the plurality of layers includes: receiving metadata related to the digital photograph; retrieving a depth value of a layer using the metadata, the depth value indicating a depth of a focussed layer in the digital photograph; and estimating an order of other layers by measuring a degree of focus of layers not focussed in the digital photograph.

Still further, in accordance with an embodiment of the present invention, the defining an order of the plurality of layers includes: receiving metadata related to the digital photograph; retrieving a depth value of a layer using the metadata, the depth value indicating a depth of a focussed layer in the digital photograph; and estimating depth values of other layers by calculating a size of circle of confusion of layers not focussed in the digital photograph.

Additionally, in accordance with an embodiment of the present invention, the defining an order of the plurality of layers includes retrieving depth values of each layer by calculating a relative displacement of the digital photograph and the video frames with movements of a capture device.

Further, in accordance with an embodiment of the present invention, the decomposing the audio samples includes using stereo source decomposition to compare different audio samples.

Still further, in accordance with an embodiment of the present invention, the decomposing further includes using an audio goniometric space-transform of said audio samples.

Additionally, in accordance with an embodiment of the present invention, the generating playback guidance includes defining at least one playback scenario for each of the video layer sequences wherein a playback scenario defines how to playback a video layer sequence.

Further, in accordance with an embodiment of the present invention, the playback scenario includes playing back the video layer sequences for an indefinite duration.

Still further, in accordance with an embodiment of the present invention, the playback scenario includes switching from playing forward to playing backward when an end of a video layer sequence is reached.

Additionally, in accordance with an embodiment of the present invention, the playback scenario includes switching from playing backward to playing forward when a beginning of a video layer sequence is reached.

Further, in accordance with an embodiment of the present invention, the playback scenario includes switching from playing forward to playing backward and vice versa when a random point of a video layer sequence is reached.

Still further, in accordance with an embodiment of the present invention, the generating playback guidance further includes: defining at least one rendering effect wherein a rendering effect defines how to display video layer sequences on a display device.

Additionally, in accordance with an embodiment of the present invention, the generating playback guidance further includes: defining when to apply a rendering effect according to a defined playback scenario.

Further, in accordance with an embodiment of the present invention, the rendering effect includes changing horizontal and vertical positions of each layer of said plurality of layers.

Still further, in accordance with an embodiment of the present invention, the said rendering effect incldues changing depth value of one or more layers of said plurality of layers.

Additionally, in accordance with an embodiment of the present invention, the rendering effect includes changing zoom value of one or more layers of said plurality of layers.

Further, in accordance with an embodiment of the present invention, the generating playback guidance includes defining at least one playback scenario for each of the audio source sequences.

Still further, in accordance with an embodiment of the present invention, the playback scenario includes synchronizing at least one audio source sequence with at least one video layer sequence.

Additionally, in accordance with an embodiment of the present invention, the playback scenario includes playing back at least one audio source sequence independently from video layer sequences.

According to a second embodiment of the present invention, there is also provided a method for playing back enriched digital photographs, the method including: receiving an order of a plurality of layers, video layer sequences and playback guidance according to the first embodiment of the present invention; and playing back the video layer sequences according to the playback guidance on a display device.

Further, in accordance with an embodiment of the present invention, the method further includes: receiving audio sources sequences and playback guidance.

Still further, in accordance with an embodiment of the present invention, the playing back the video layer sequences includes generating at least one random point in the video layer sequences, and switching from playing forward to playing backward and vice versa when a random point is reached.

Additionally, in accordance with an embodiment of the present invention, the said playing back the video layer sequences includes generating at least one random point in the video layer sequences, and overlaying a first portion of the video layer sequences currently being played with a second random portion of the video layer sequences when a random point is reached.

Further, in accordance with an embodiment of the present invention, the playing back said video layer sequences includes generating at least one random point in the video layer sequences, and overlaying a first portion of the video layer sequences currently being played with a second portion of the video layer sequences when an end of the video layer sequences is reached wherein said second portion is played back from a random point.

According to a third embodiment of the present invention, there is also provided a method for taking an enriched digital photograph, the method including: automatically start capturing video data with a capture device; capturing a digital photograph during the capturing of said video data; and automatically stop capturing said video data.

Further, in accordance with an embodiment of the present invention, the automatically start capturing video data further includes automatically start capturing audio data; and the automatically stop capturing said video data includes automatically stop capturing audio data.

Still further, in accordance with an embodiment of the present invention, the method further including: storing the captured audio and/or video data.

Additionally, in accordance with an embodiment of the present invention, the automatically start capturing video data includes automatically start capturing video data when movement of the capture device is detected.

Further, in accordance with an embodiment of the present invention, the movement of the capture device is detected by an accelerometer.

Still further, in accordance with an embodiment of the present invention, the automatically start capturing video data includes automatically start capturing video data when an eye of a user placed against a viewfinder of the capture device is detected.

Additionally, in accordance with an embodiment of the present invention, the automatically start capturing video data includes automatically start capturing video data when an auto-focusing sharpness value of the capture device is reached.

Further, in accordance with an embodiment of the present invention, the automatically start capturing video data includes automatically start capturing video data when a voice from a user is detected by the capture device.

Still further, in accordance with an embodiment of the present invention, the automatically stop capturing video data includes automatically stop capturing video data when a predefined sound from a user is detected by the capture device.

Additionally, in accordance with an embodiment of the present invention, the automatically stop capturing video data includes automatically stop capturing video data when a predefined movement of the capture device is detected.

There is also provided in accordance with a fourth embodiment of the present invention apparatus for taking enriched digital photographs, the device including: means for automatically start capturing video data with a capture device; means for capturing a digital photograph during said capturing of the video data; and means for automatically stop capturing the video data.

There is also provided in accordance with a fifth embodiment of the present invention apparatus for enriching digital photographs, the device including: means for receiving a digital photograph and video data captured before a time at which the digital photograph is captured until after said time, wherein the video data includes a sequence of video frames; means for processing the digital photograph and the video frames to layer the digital photograph and the video frames into a plurality of layers thereby creating a plurality of video layer sequences; means for ordering the plurality of layers; means for generating playback guidance, the playback guidance defining how to combine the video layer sequences during playback; and means for transmitting the order, the video layer sequences and the playback guidance to a display device for playback.

There is also provided in accordance with a sixth embodiment of the present invention apparatus for displaying enriched digital photographs, the device including: means for receiving an order of a plurality of layers, video layer sequences and playback guidance from an apparatus from the fifth embodiment; and means for playing back the video layer sequences according to the playback guidance on a display device.

There is also provided in accordance with a seventh embodiment of the present invention a device for taking a picture, the device being characterized in that it includes means for automatically starting the recording of audio and/or video data before the picture is taken.

BRIEF DESCRIPTION OF THE DRAWINGS

The present invention will be understood and appreciated more fully from the following detailed description, taken in conjunction with the drawings in which:

FIGS. 10a and 10b are simplified pictorial illustrations of inpaiting operations for picture restoration;

FIGS. 11a and 11b are simplified pictorial illustrations of inpainting operations consisting of filling-in transparent areas according to an embodiment of the present invention;

FIGS. 12a and 12b are simplified pictorial illustrations of inpainting operations consisting of filling-in transparent areas according to a further embodiment of the present invention;

DETAILED DESCRIPTION OF EMBODIMENTS

Nowadays, photos and videos—digital and analogue—are very popular formats of personal media. The goal of these media is to give the user the opportunity to relive a unique experience by capturing the emotion of a life scene.

The present invention, in embodiments thereof, relates to apparatus and methods for enriching the picture playback experience while still allowing a user to capture an instant previously represented by a photograph, even when it is unexpected.

More and more still picture cameras enable High Definition (HD) movie shooting and each frame of those HD movies have a resolution, which allows it to be used as a still picture that can be viewed on a digital screen. A new format of photography is proposed that breaks the previous constraints of viewing and printing photographs, namely that photographs have typically been both mute and static. This new format of photography, according to embodiments of present invention, typically includes dynamicity to allow a totally different point of view in the media playback experience. This new format of photography, according to embodiments of the present invention, referred to in the present patent application as "Phodeo", adds motion to previously static photographs to give depth and emotion to the picture while keeping it as the reflection of an instant, shot by the user in one click on a digital camera, and consumed on a display device such as a digital picture frame, a computer, a TV or a mobile handset. In a further embodiment of the present invention, this new format of photography adds sound and motion to previously mute and static photographs.

Figure 1:
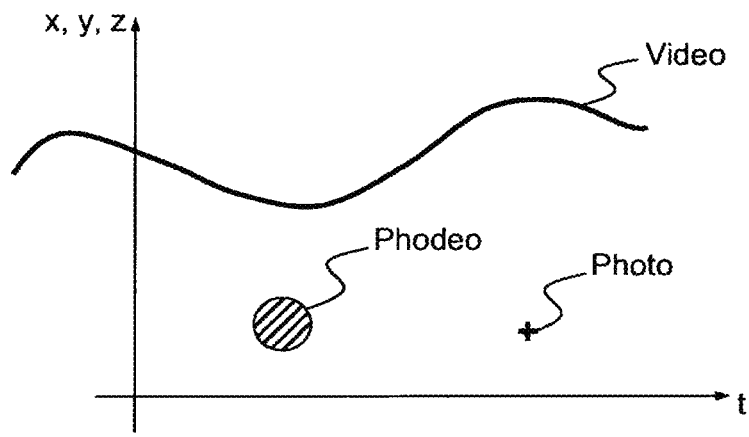
FIG. 1 is a simplified graphical illustration showing the comparison in space and time between photographic media, video media and Phodeo media.

Reference is now made to FIG. 1, which is a simplified graphical illustration showing the comparison in space and time between photographic media, video media and Phodeo media.

In FIG. 1, a photo is represented as a point ("0D" i.e. zero dimension). It is a fixed point of space (the place where the photo has been taken) at a fixed point in time (the very limited time slice when the camera shutter was opened: ⅕₀₀th of second for example). It can even show something different from "what you see": a photo taken at ⅕₀₀th of second will freeze the movement that your eye only saw blurred. It is a very good way to understand what happened but not to feel what you lived/experienced.

In FIG. 1, a video is represented as a curve ("1D" i.e. one dimension). It is a path in space (the spatial path you follow during the sequence recording) along a specific period of time (duration of the recorded sequence). It represents a movement and records a sound. It can be seen as the exact transcription of "what your eyes saw and what your ears heard". In this sense, a video is a much better way to feel and remember the emotion of a moment than a photo. However, the video is no longer an instant but rather a story telling experience that the user follows from the beginning to the end and from the camera operator's point of view.

In FIG. 1, a Phodeo is represented as a surface ("2D" i.e. two dimension). It will be the result of a small amount of space crossbred with a small amount of time. Inside this time-space singularity, the Phodeo provides, at any time and as long as the user wants, a refreshed experience of the reflected instant. Playing the Phodeo media allows the user to see different points of view and it will not look the same twice.

The present invention, in embodiments thereof, describes how to capture in "one click" (typically with a digital camera) enough and appropriate data for displaying the Phodeo media. Methods and apparatus for processing the captured data are described. Also described are effects to apply and how to apply those effects to the captured data.

The Phodeo system according to embodiments of the present invention comprises three elements:

a Phodeo capture component: for example, it may be a digital camera enhanced with Phodeo features that automatically captures audio and video (AV) data around the instant that a picture was taken. Typically, these AV data and the picture taken are stored in a single file (Phodeo raw data file) on the Phodeo capture device along with additional metadata such as the picture taken, Exchangeable Image File Format (EXIF) data, capture timeline data, sensor information etc.;

a Phodeo factory module: this is typically a software module that receives the AV data along with additional metadata from the Phodeo capture component. The Phodeo factory module mixes and authors the silent Phodeo captured data according to the nature of the scene and the set of available motion effects (such as back and return loop, fading, morphing, random, parallax motion, focus on different layers, etc.) and sound effects (such as synchronized, random, mixing, ambient outsourced) into a Phodeo file. These post-authoring effects are done according to the specific nature of the captured scene (e.g. portrait, group, sport, landscape/monument, etc).

The Phodeo factory module processes the picture and each frame of the video data, in order to layer the picture and the frames of the video data into a plurality of video layers. Typically, the picture and each video frame are decomposed into three different layers (fore, mid and background). In another embodiment of the present invention, the Phodeo factory module is able to identify a plurality of layers in the video data and therefore decomposes the picture and each video frame into a plurality of identified video layers.

The Phodeo factory module also processes the audio data, by decomposing the audio into a plurality of audio sources.

Then, video sequences (respectively audio sequences) are created for each video layer obtained from the layering operation (respectively for each audio source obtained from the decomposing operation).

Finally, a depth map is generated, the depth map defining the order of the layers and the distance between each layer. The output of the Phodeo factory module is a Phodeo file containing:

a plurality of video sequences (typically one video sequence per identified video layer);

a plurality of audio sequences (typically one audio sequence per identified audio source); and an eXtensible Mark-up Language (XML) file containing spatial information and playback guidance.

a Phodeo player device: this component receives the Phodeo file from the Phodeo factory module. This Phodeo player can be any type of displaying device comprising video capabilities. For example, and without limiting the generality of the invention, the Phodeo player is a digital picture frame or a computer or a TV or a mobile handset comprising video capabilities. The Phodeo player plays out the Phodeo file according to playback guidance (video scenario, effect and sound mixing scenario). Playing out the Phodeo file includes:

playing out each video sequence according to a defined scenario;

calculating size and position of each layer to create effects; and playing out each audio sequence according to a sound mixing scenario.

In a further embodiment of the present invention, the playback guidance is defined so that the Phodeo file can be played out according to a plurality of scenarios for the video sequences, a plurality of effects and a plurality of sound mixings scenarios for the audio sequences. Thus, the Phodeo file may be played out for an indefinite duration and the final rendering is typically not the same twice.

The Phodeo capture is typically done automatically by a Phodeo capture component typically included in digital camera software. For the user, the Phodeo capture is just like taking a photo. The user may have explicitly selected a Phodeo shooting mode or set the camera's general settings to "always make a Phodeo when taking a photo" combined with a regular photo shooting mode. The camera and its Phodeo capture component acquire AV data and the picture taken for creating a Phodeo.

When the user takes a photo, the camera typically automatically records one or more Phodeo raw data during the framing phase. Those data may comprise video data (with or without audio) or audio data. The camera can use the following available information to decide when to automatically start and/or stop the recording of audio and/or video (AV) data:

camera position and movement: horizontal and steady and/or vertical and moving;

shutter button: halfway or full pressing;

auto-focusing sharpness values for different operations: in progress, impossible or achieved.

To provide this information, a plurality of sensors and software components are able to start and/or stop the capturing of the Phodeo raw data (i.e. AV data):

an accelerometer (a camera usually has a horizontal/vertical detection sensor but an accelerometer is useful);

a viewfinder eye detection system (capable of detecting if the photographer has his eye placed against the viewfinder) can be used to determine when the photographer begins to frame the scene and when he ends it; and a voice/sound analyzer component can be used to determine when to start and/or stop the recording in cases where the photographer/user is speaking before and/or after the picture is taken.

For instance, and without limiting the generality of the present invention, some pre-defined sound received by the voice/sound analyser from the user may automatically start/stop the recording of AV data. Similarly, some pre-defined camera movements may automatically start/stop the recording of the AV data.

For sake of clarity, the tables below compare a classic photo shooting sequence (Table 1) with an enhanced Phodeo shooting sequence (Table 2).

TABLE 1

Typical photo shooting sequence

| User action | Camera action |
| --- | --- |
| The user turns on the camera | Nothing. |
| The user places his eye against the viewfinder | Nothing. |
| The user frames | Auto-focusing system starts. |
| The user presses the shutter button halfway | Auto-focusing system continues or starts (if previous step missed). |
| The user presses the shutter button entirely | Picture is taken and stored. |

TABLE 2

Phodeo shooting sequence

| User action/Camera action | Phodeo capture component action |
| --- | --- |
| The user turns on the camera | Nothing. |
| The user aims (places his eye against the viewfinder or camera steady & horizontal) | Audio data recording begins (audio review buffer starts). |
| The user frames | Auto-focusing starts and audio data recording continues (or begins if previous steps missed). |
| The user presses the shutter button halfway | Auto-focusing starts/continues and audio data recording continues (or begins if previous steps missed). |
| Auto-focusing is achieved | Full video data recording begins (image and audio) (video review buffer starts). |
| The user presses the shutter button entirely | Picture is taken and stored. While the camera takes the picture, the Phodeo capture component continues to record video data. |
| The user releases the shutter button | Video data recording continues. |
| The user pulls the camera down to look at the picture on the back screen | Video data recording stops. Audio data recording continues. |
| The user begins to comment the photo, show it to other people, . . . | Audio data recording stops. All the AV data (called "Phodeo raw data"), the full resolution photo and all additional useful information (e.g. EXIF data, capture timeline data, sensor information) are assembled in a "Phodeo raw data" file that is written on the camera storage area (flash memory card or other). |

In a case where no picture is taken, the Phodeo capture component typically erases both the video and audio review buffers. The same review buffer can be truncated by the Phodeo capture component if there is too much time:
- between framing and shooting; and/or
- between shooting and pulling-down the camera.

A Phodeo raw data file typically contains:
- the "Phodeo raw data" (AV data);
- the full resolution picture in an image format like JPEG (Joint Photographics Experts Group) or TIFF (Tagged Image File Format);
- useful information about the shooting sequence and the data (EXIF data, capture timeline data, sensor information, etc.;

This Phodeo raw data file is typically independent of the native media created by the camera, which is usually a full resolution photo in JPEG or RAW (raw image file) format.

To be Phodeo capable, a digital camera comprises at least:
- Phodeo capture component software;
- video data capture capabilities: the camera is typically able to capture video data (typically High-Definition (HD) video data of at least: 1280×720 pixels resolution, at 25 or 30 frames per seconds); and
- audio data capture capabilities (typically a built-in microphone). The digital camera is also able to take a full resolution photo while recording video data.

In an embodiment of the present invention, the digital camera comprises High-Definition (HD) video data capabilities. The digital camera is then able to capture standard HD video data.

The Phodeo capture component outputs a Phodeo raw data file that is then transmitted to the Phodeo factory module. As explained above, this file contains:
- the Phodeo raw data (AV data);
- the full resolution picture in an image format like JPEG or TIFF;
- all additional useful information about the shooting sequence and the data (e.g. EXIF data, capture timeline data, sensor information, etc.).

Figure 2:
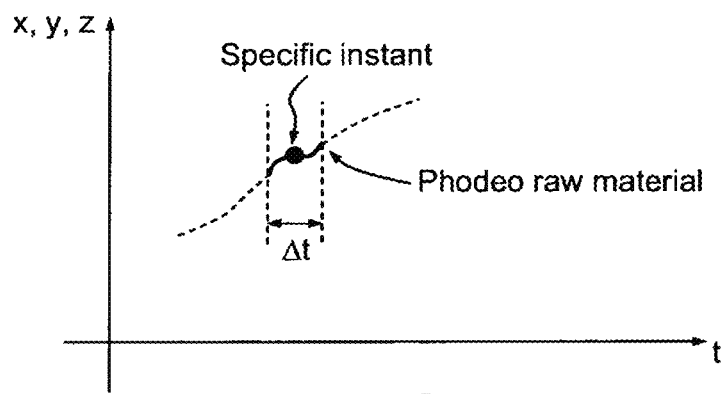
FIG. 2 is a simplified graphical illustration showing captured raw Phodeo data.
Figure 3:
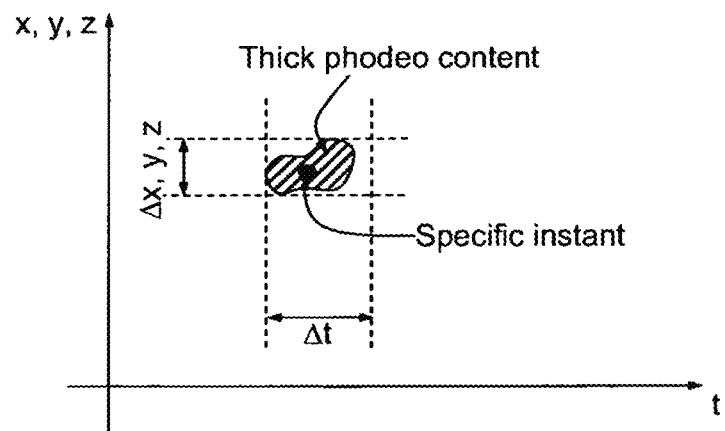
FIG. 3 is a simplified graphical illustration showing two dimensional (2D) processed Phodeo data.

Reference is now made to FIG. 2, which is a simplified graphical illustration showing captured raw Phodeo data. As explained previously, a video is a path in space along a specific period of time. Similarly, Phodeo raw data are short AV sequences (small length of the AV data captured) centered on a specific instant. In this sense, the Phodeo raw data gives 1D temporal thickness ($\Delta t$) to a classic 0D picture. An aim of the Phodeo factory module is to bring a further spatial dimension to transform the Phodeo raw data into two-dimensional (2D) processed Phodeo data, as illustrated in FIG. 3, which is a simplified graphical illustration showing two-dimensional (2D) processed Phodeo data. To illustrate this approach, the outputs of the Phodeo factory module can be considered as 2D Phodeo data that has both temporal and spatial thickness ($\Delta t$, $\Delta xyz$).

To provide spatial thickness, a layered approach for both audio and video is considered. This approach is a simplification of the real spatial nature of the captured data.

Figure 4:
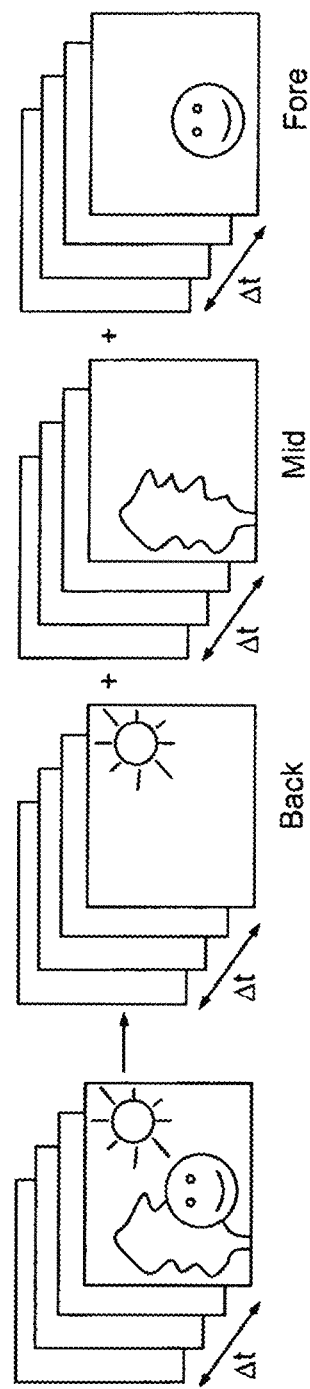
FIG. 4 is a simplified pictorial illustration of the layering operation in accordance with an embodiment of the present invention.

Reference is now made to FIG. 4, which is a simplified pictorial illustration of the layering operation in accordance with an embodiment of the present invention. FIG. 4 illustrates the principle of the layering approach simplification at a given instant of the Phodeo raw data. The motivation for dealing with a layered description of the scene is to consider the face-tree-sun description as a very good (typically the best) approximation of the 3D scene represented on the left of FIG. 4, considering the 2D flat AV data received as input by the Phodeo factory module. As a consequence, the Phodeo factory module is responsible for building the spatial layering of the Phodeo raw data:
- for video, layering is performed for each successive frame contained in the input video data; and
- for audio, layering is performed for the audio stereo sample contained in the input audio data.

The layering approximation works with discrete image area and/or audio pattern. This approach introduces the video/image segmentation and stereo audio source decomposition.

The Phodeo factory module processes the picture and each frame of the video data, in order to layer the picture and the frames of the video data into a plurality of video layers. The image (picture and video frame) segmentation is achieved by the Phodeo factory module in three steps:
- edge detection;
- zone clustering; and
- layer projection.

Figure 5B:
FIGS. 5a, 5b and 5c are simplified pictorial illustrations of the layering operation in accordance with a further embodiment of the present invention.
Figure 5C:
Figure 5A:

Reference is now made to FIG. 5A to 5C, which are simplified pictorial illustrations of the layering operation in accordance with a further embodiment of the present invention. To illustrate the image layering process, the example of FIG. 5a is taken, with an arbitrary objective of a three layer spatial decomposition.

The first step is enhanced edge detection. In an embodiment of the present invention, the Canny edge detection method is applied (see http://en.wikipedia.org/wiki/Canny_edge_detector) although other methods of edge detection will be apparent to someone skilled in the art. From the binary edge map, the Phodeo factory module uses a multi-stage algorithm to detect a wide range of edges in images. This operation helps to reduce the number of zones detected in images. FIG. 5b illustrates the result of the edge detection obtained using the Canny edge detection method.

The second step is zone clustering. In an embodiment of the present invention, the K-means clustering algorithm (see http://en.wikipedia.org/wiki/K-means_clustering) is applied using a mixed colour and intensity distance function although other clustering algorithms will be apparent to someone skilled in the art. In image analysis, the K-means algorithm is used to partition an image into K clustered zones. FIG. 5c illustrates the result of the pixel clustering method with the number of zones as a constraint that stops the iterative clustering operation once the desired number of zones has been found. It will be appreciated by those skilled in the art that background zones consist of multiple non-connected sub-zones, while the K-means clustering algorithm ended with every sub-zone as a zone. The Phodeo factory module applies a non-local similarity algorithm based on a mixed colour and intensity distance during the iterative clustering operation to aggregate zones of a similar colour.

Figure 6A:
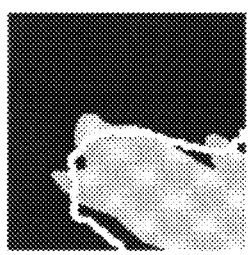
FIGS. 6a, 6b and 6c are simplified pictorial illustrations of the layering projection operation in accordance with an embodiment of the present invention.
Figure 6B:
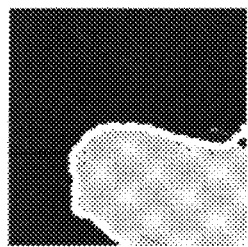
Figure 6C:
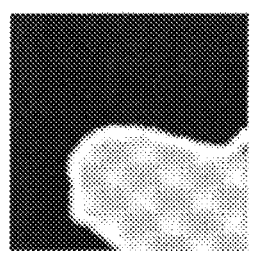

The third step is layer projection. Reference is now made to FIGS. 6a to 6c, which are simplified pictorial illustrations of the layering projection operation in accordance with an embodiment of the present invention. The edge map obtained from the first step (edge detection) and the clustered map obtained from the second step (zone clustering) are superposed as shown in FIG. 6a so that clustered zone boundaries match the edges. As the two maps come from different steps, local distortions of the clustered zone are allowed to match the fixed edge map (as a reference boundary map). In an embodiment of the present invention, the method to perform the superposition is local homothetic transformation that minimizes the mean square distance between zone boundaries and edges. FIG. 6b illustrates how the previously clustered zones have been distorted to match the white edge boundary. The edge white thickness in the middle that separates clustered zones is then turned into a linear progressive border between zones, as illustrated by FIG. 6c.

Figure 7A:
FIGS. 7a, 7b and 7c are simplified pictorial illustrations of results obtained from the layering operation according to an embodiment of the present invention.
Figure 7B:
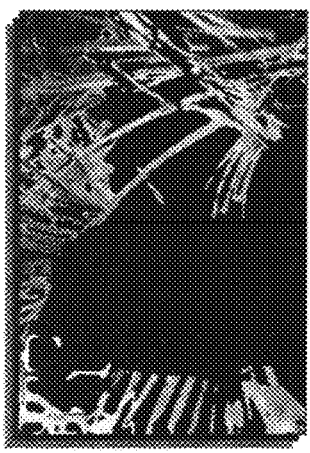
Figure 7C:

Reference is now made to FIGS. 7a to 7c, which are simplified pictorial illustrations of results obtained from the layering operation according to an embodiment of the present invention. According to the transformed map illustrated by FIG. 6c, the original input image is then progressively decomposed into three images (one image per layer). Each layer contains clustered zones whose alpha channel values correspond to the colour intensity retrieved from the last transformed map as shown in FIG. 6c. This image segmentation is done successively for every image part of the input video data. As a final result of image decomposition, the output of the image segmentation operation is illustrated by FIGS. 7a, 7b and 7c, where black zones are transparent zones i.e. alpha channel values set to zero. At the end of this video data processing operation, a video sequence is therefore created for each video layer.

The Phodeo factory module also processes the audio data by decomposing audio data into a plurality of audio sources. The same segmentation is then applied to the audio data. Using stereo source decomposition techniques, the audio data comprising a plurality of audio samples are compared to detect different audio sources. In an embodiment of the present invention, audio goniometric space-transform of the audio samples is applied to achieve this segmentation. The expected output is multichannel audio samples. At the end of this audio data processing operation, an audio sequence is therefore created for each audio source.

The Phodeo factory module then generates a depth map, the depth map defining the order of the layers, the distance between each layer, and/or the distance between each layer and the Phodeo capture component. As the Phodeo raw data can be considered as video data, the depth map is computed for any layer of any image/frame contained in the video data. The Phodeo factory module assumes that the depth of a given video layer is the same across the video data. Indeed, this approximation is appropriate given the fact that a Phodeo represents a small amount of time ($\Delta t$). Then, from the previous layering stage, the Phodeo factory module computes an estimation of the depth value (z) for each layer obtained previously (e.g. z depth value for background, mid and foreground). This z depth value of a layer represents the distance separating the layer from the Phodeo capture component at the instant of which the picture was taken.

Depending on the availability of EXIF values from the Phodeo raw data file, two options are considered:

EXIF & layer-ordering depth map option: computation based on existing EXIF data and estimation using degree of focus of the segmented region; and improved depth map option: computation using precise camera operation parameters on the short video data.

In an embodiment of the present invention, the depth map is defined using EXIF data. EXIF data contains relevant information that can be used for the Phodeo raw data in order to retrieve the depth of a given layer in the image. For instance, the Phodeo raw video data contains at least a specific instant shot picture that is a full format picture with optional EXIF data. From EXIF 2.2 specification, if provided in the Phodeo raw data file, the following tags are used:

```
{
    SubjectDistance         tag.ref.37382 (9206.H)
    OR
    SubjectDistanceRange    tag.ref.41996 (A40C.H)
}
AND
{
    SubjectArea             tag.ref.37396 (9214.H)
    OR
    SubjectLocation         tag.ref.41492 (A214.H)
}
```

The following definitions (taken from Standard of Japan Electronics and Information Technologies Industries Association; Exchangeable image file format for digital still cameras: Exif version 2.2, JEITA CP-3451, April 2002) will aid understanding of embodiments of the present invention.

SubjectDistance: this tag indicates the distance to the subject, given in meters;

SubjectDistanceRange: this tag represents the distance range to the subject;

SubjectArea: this tag indicates the location and area of the main subject in the overall scene; and SubjectLocation: this tag indicates the location of the main subject in the scene. It is a vector that points to the subject relative within the picture. The value of this tag represents the pixel at the centre of the main subject relative to the left edge, prior to rotation processing as per the Rotation tag. As explained in the above definition, the area or location is used to identify the location and area of the main subject in the overall scene. Given the layering stage, the main subject refers to a specific layer for which the z depth value is given by the subject distance or subject distance range. In other words, EXIF data are used to retrieve the z depth value of the layer that was focussed (main subject) at the instant of which the picture was taken. Then, the Phodeo factory module computes an estimate of the z depth value for the other layers i.e. layers that were not focussed, by measuring the degree of focus (image blurriness) of other parts of the picture and/or frames of the video data.

In an embodiment of the present invention, the Phodeo factory module calculates the circle of confusion for parts of the picture that are not focussed in order to retrieve z depth values and ordering the other layers. Using the available EXIF data, it can be assumed that the subject zone was at a depth of field at a known distance from the Phodeo capture component. The Phodeo factory module then applies a derivative Sobel filter (see http://en.wikipedia.org/wiki/Sobel_operator) to maximize sharpness so that the size of this derivative Sobel filter corresponds to the negative pattern of the circle. Using the following formula:

$$c = \frac{fA}{S}$$

where c is the estimated size of the circle of confusion (or thickness of Sobel derivative filter), where f is the focal length of a Phodeo capture device and where A is the aperture of a Phodeo capture device. Those skilled in the art will appreciate that A and f can be provided from the EXIF data:

| | |
|---|---|
| ApertureValue | tag.ref.37378 (9202.H) |
| FocalLength | tag.ref. 37386.(920A.H) |

It can be roughly considered that the larger the circle of confusion, the farther is the considered part of the image from the Phodeo capture component at the specific instant at which the picture was taken. While it could be interesting to get the real z value using such method, an estimation of the degree of focus for a specific zone provides basic layer-ordering information that is enough to get a good modelling of the real 3D scene, given the approximation taken (layering and fixed depth). Those skilled in the art will appreciate that several well-known techniques such as occultation, texture gradient etc. may be used to order the different layers.

In a further embodiment of the present invention, the depth map is defined using camera parameters related to the video data. A more advanced method for getting the depth map may be the use of relative displacement of points of interest along the Phodeo raw video data correlated with available precise camera operation movement across time.

Those skilled in the art will appreciate that these different methods which are, for clarity, described in contexts of separate embodiments may also be provided in combination in a single embodiment or in any suitable subcombination.

Figure 8:
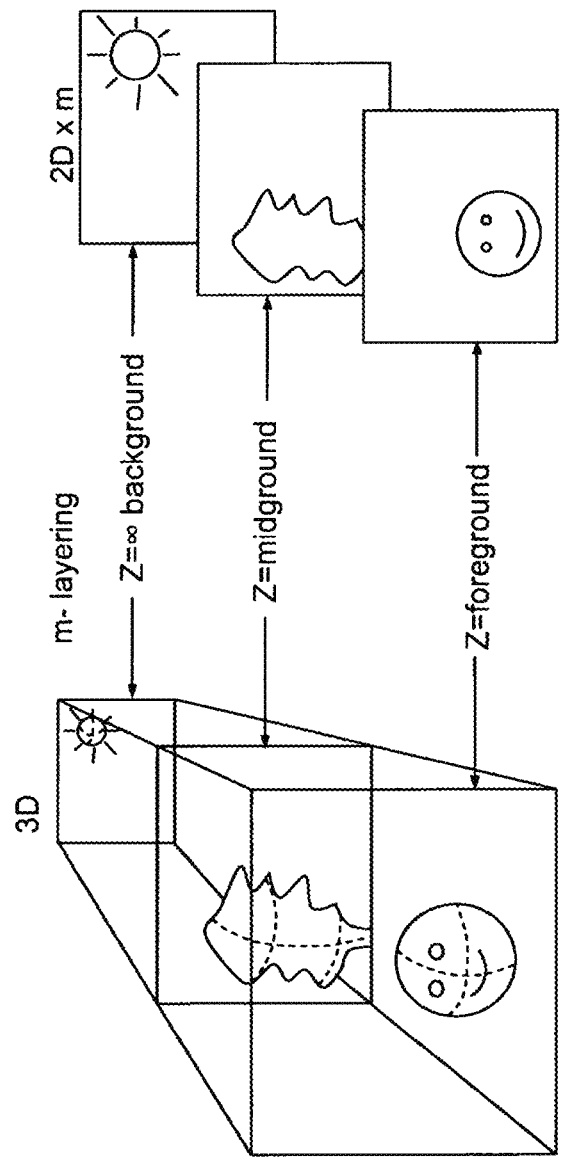
FIG. 8 is a simplified pictorial illustration of the ordering and z depth value calculation operations according to an embodiment of the present invention.

Reference is now made to FIG. 8, which is a simplified pictorial illustration of the ordering and z depth value calculation operations according to an embodiment of the present invention. The depth map stage results in obtaining the z depth values for the different layers which are assumed to be same across the video data. Given the illustration of FIG. 8, the depth map stage outputs a fixed ordering of the layers. The goal of this depth map stage is to retrieve at least the z depth value of the foreground layer which corresponds to the distance to main subject in the overall scene (when the degree of focus and the camera movement options both failed).

Figure 9:
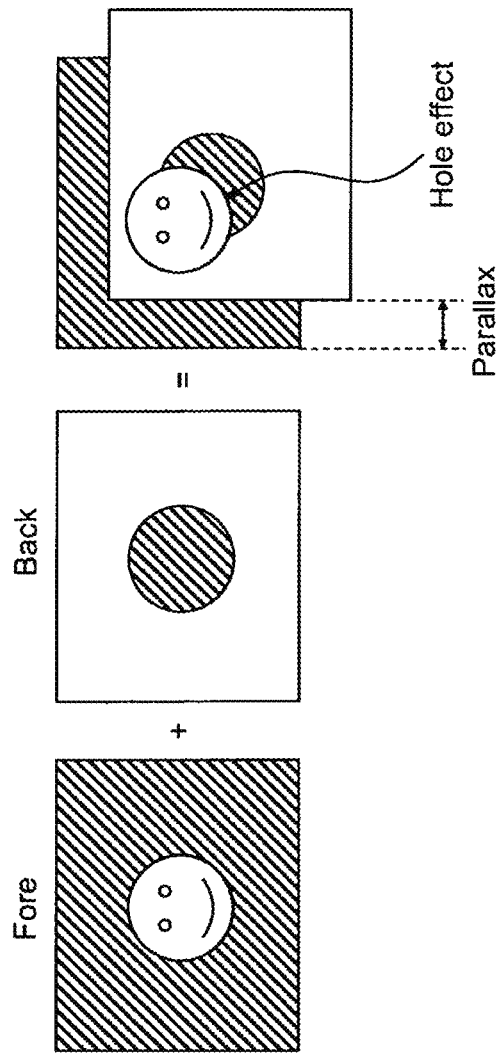
FIG. 9 is a simplified pictorial illustration of the inpainting operation according to an embodiment of the present invention.

Reference is now made to FIG. 9, which is a simplified pictorial illustration of the inpainting operation according to an embodiment of the present invention. Once the layering and ordering processes are achieved, the Phodeo factory module has a set of layers ordered by z values. One issue is to avoid subsequent parallax effects when layers are superposed at different positions. FIG. 9 illustrates that inpainting may be performed for the bottom layer in order to avoid the hashed transparent area in the final right-hand layer-composition due to parallax. The Phodeo factory module typically detects layers that are overlaid by other layers. These overlaid zones are typically transparent areas that may be inpainted. The last step is to reconstruct harmonious patterns/colors by filling in these transparent areas.

Inpainting is about creating harmonious patterns in place of missing parts of the picture. Inpainting is commonly used for picture restoration as illustrated by FIGS. 10a and 10b. However, the Phodeo inpainting is not targeting image restoration. Here, the purpose of the inpainting is to fill-in transparent areas, as illustrated by FIGS. 11a and 11b. FIG. 11a shows an image masked by black rectangular transparent areas whereas FIG. 11b shows the same image after the inpainting process: transparent areas have been reconstructed according to left image pattern. One inpainting method consists of propagating the surrounding colours using an inpainted Laplacian field in transparent areas with a limit condition from the boundary of the original image, by using the following Laplace operator:

$$\mathrm{div}\nabla u = \Delta u = 0.$$

(see http://en.wikipedia.org/wiki/Laplace_operator). Other methods of inpainting will be apparent to those skilled in the art. The background layer is inpainted because the final layer-composition cannot display any transparent area. For instance, FIG. 12a illustrates the same original background layer as the previous FIG. 7a. FIG. 12b illustrates the results of inpainting operations in accordance with an embodiment of the present invention.

By design, the foreground layer is not inpainted, but mid layers may be locally inpainted. The local convexity of layers is a good hint to locate which parts of mid layers may be locally inpainted. This is related to de-occlusion techniques. Determining the zones on which intermediate deocclusion may be applied is a complex problem.

Figure 13:
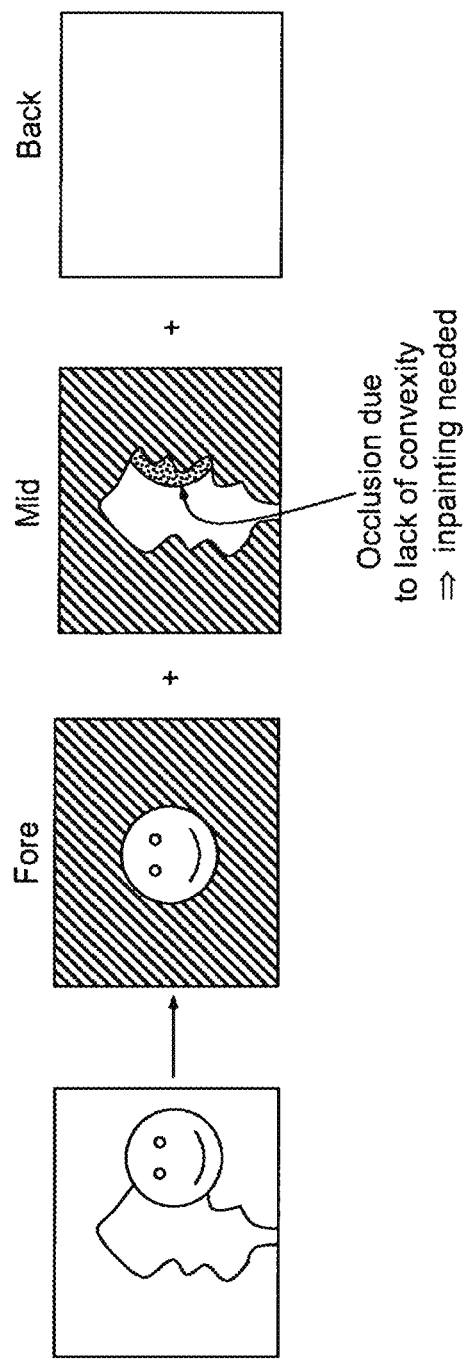
FIG. 13 is a simplified pictorial illustration of deocclusion, connectivity and inpainting operations according to an embodiment of the present invention.

Reference is now made to FIG. 13, which is a simplified pictorial illustration of deocclusion, connectivity and inpainting operations according to an embodiment of the present invention. FIG. 13 illustrates the case where occlusion, connectivity and inpainting may solve the problem. A deocclusion technique is applied to a surface overlaid by an upper layer. Typically, in FIG. 13 the mid layer is partially overlaid by the fore layer. The technique detects the bordering pixels that are shared by the fore and the mid layers e.g. the left part of the tree, and then determines the zone in the mid layer that may be inpainted. To determine the mid layer zone that may be inpainted, different techniques can be used. For example, and without limiting the generality of the invention, normalizing the radius of curvature can be applied on the bordering pixels that are shared with the upper layer e.g. the dotted zone identified in the mid layer. The normalization of the radius of curvature could be done using:

maximization of the absolute radius of curvature of the mid layer bordering pixels e.g. cannot be inferior/superior to a given negative/positive value (clearing picks & holes); or integrating the radius of curvature between the extreme pixels of the mid layer bordering pixels shared with the fore layer (smoothing the average curve).

The output of the Phodeo factory module is a Phodeo file containing:

a plurality of video sequences (typically one video sequence per identified video layer);

a plurality of audio sequences (typically one audio sequence per identified audio source); and an eXtensible Mark-up Language (XML) file containing: spatial information; and
playback guidance for the Phodeo player device.

An exemplary output of a Phodeo factory is given below:

```
<?xml version="1.0" encoding="iso-8859-1"?>
<phodeo type="loop">
    <ref_image id="1"/>
    <layers>
        <layer id="foreground" z="1.5">
            <sequences>
                <sequence fps="12" scenario_id="1" >
                    <ref_image id="1"/>
                    <ref_image id="2"/>
                    <ref_image id="3"/>
                    <ref_image id="4"/>
                    <ref_image id="5"/>
                </sequence>
            </sequences>
        </layer>
        <layer id="mezzanine" z="2">
            <sequences>
                <sequence fps="12" scenario_id="1">
                    <ref_image id="6"/>
                    <ref_image id="7"/>
                    <ref_image id="8"/>
                    <ref_image id="9"/>
                    <ref_image id="10"/>
                </sequence>
            </sequences>
        </layer>
        <layer id="background" z="7">
            <sequences>
                <sequence fps="12" scenario_id="2" >
                    <ref_image id="11"/>
                    <ref_image id="12"/>
                    <ref_image id="13"/>
                    <ref_image id="14"/>
                    <ref_image id="15"/>
                </sequence>
            </sequences>
        </layer>
    </layers>
    <tracks>
        <track scenario_id="2">
            <ref_audio id="1"/>
        </track>
        <track scenario_id="3">
            <ref_audio id="2"/>
        </track>
    </tracks>
    <images>
        <image name="image-00001.jpg" id="1"/>
        <image name="image-00002.jpg" id="2"/>
        <image name="image-00003.jpg" id="3"/>
        <image name="image-00004.jpg" id="4"/>
        <image name="image-00005.jpg" id="5"/>
        <image name="image-00006.jpg" id="6"/>
        <image name="image-00007.jpg" id="7"/>
        <image name="image-00008.jpg" id="8"/>
        <image name="image-00009.jpg" id="9"/>
        <image name="image-00010.jpg" id="10"/>
        <image name="image-00011.jpg" id="11"/>
        <image name="image-00012.jpg" id="12"/>
        <image name="image-00013.jpg" id="13"/>
        <image name="image-00014.jpg" id="14"/>
        <image name="image-00015.jpg" id="15"/>
    </images>
    <audios>
        <audio name="audio-capture-001.mp3" id="1"/>
        <audio name="piste1-cd3.mp3" id="2"/>
    </audios>
    <scenarios>
        <scenario type="forward_backward" id="1">
        <scenario type="random_overlay" id="2">
        <scenario type="loop" id="3">
    </scenarios>
    <effect type="random">
        <alpha min="–10" max="10" speed="0.2">
        <distance min="100" max="110" speed="2">
    </effects>
</phodeo>
```

Figure 14:
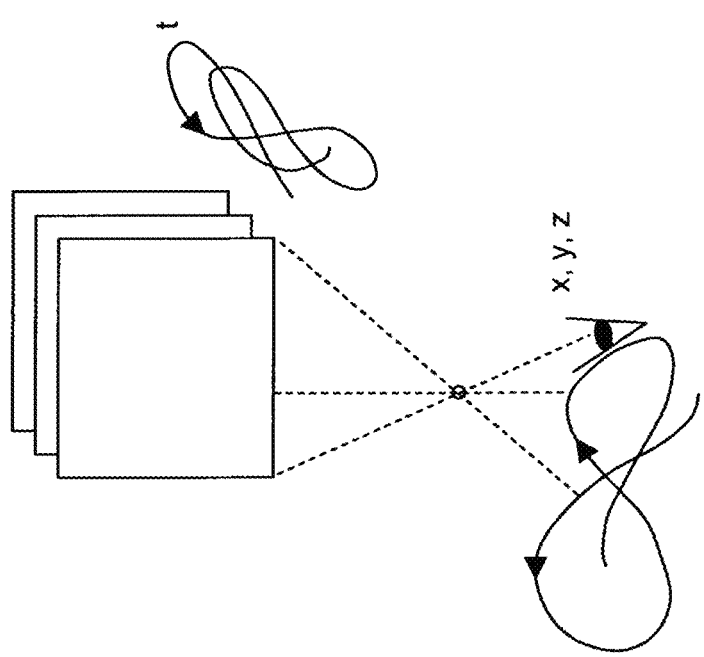
FIG. 14 is a simplified pictorial illustration showing how to dynamically change size and position of each layer and point of view according to an embodiment of the present invention.

The Phodeo Player device is a component which receives a Phodeo file as input from the Phodeo factory module and renders the Phodeo dynamically in a graphic memory for displaying it on a screen. To do so, the Phodeo player device processes the following tasks in parallel:

playing back each video sequence according to a scenario defined in the playback guidance;

combining the sequences by calculating size and position of each layer and overlaying them for dynamically changing the view point according to the effect defined in the playback guidance, as illustrated by FIG. 14;

playing back each audio sequence according to a sound mixing scenario defined in the playback guidance.

A scenario defines how to playback a video sequence and each video sequence has a particular dedicated scenario defined in the playback guidance for playback. Typical scenarios include the following:

random forward and backward; and/or random mixing.

Figure 15:
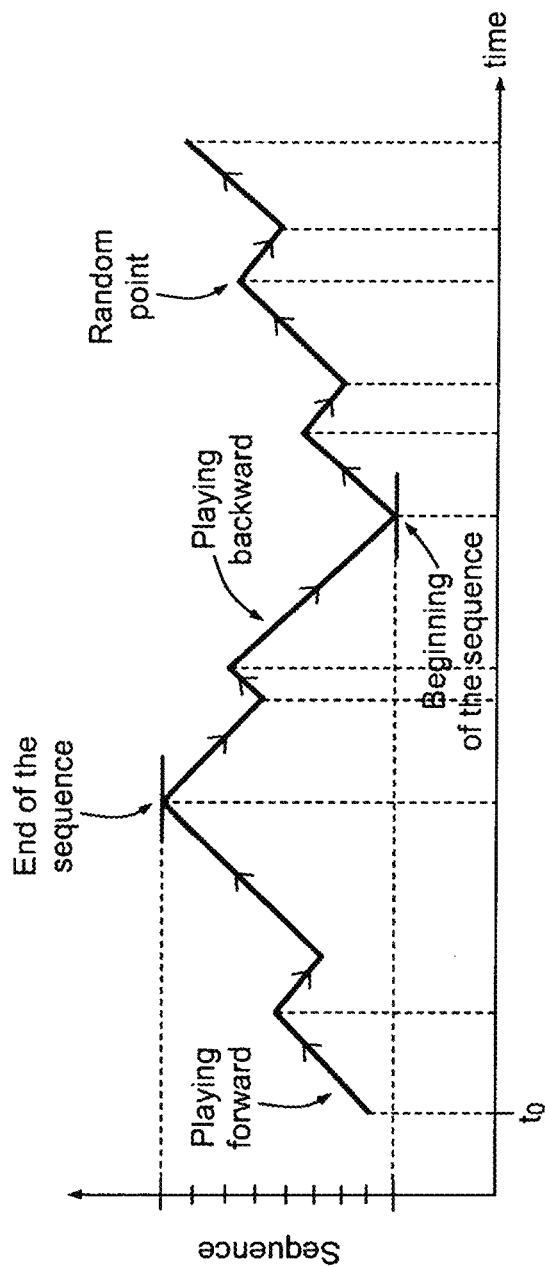
FIG. 15 is a simplified graphical illustration showing random forward and backward playback scenario according to an embodiment of the present invention.

In an embodiment of the present invention, a video sequence is played back on the Phodeo player device according to the random forward and backward scenario. As illustrated on FIG. 15, random forward and backward playback scenario includes playing forward the video sequence to a random point, then playing backward to a new random point, and then repeat these steps with different random points each time, said random points being generated randomly by the Phodeo display device. If the end of the sequence is reached by playing forward, then it automatically switches to playing backward and symmetrically, if the beginning of the sequence is reached by playing backward, then it automatically switches to playing forward. This scenario is suited to contexts where there is no specific direction in the movements. This scenario is typically well adapted for portraits.

Figure 16:
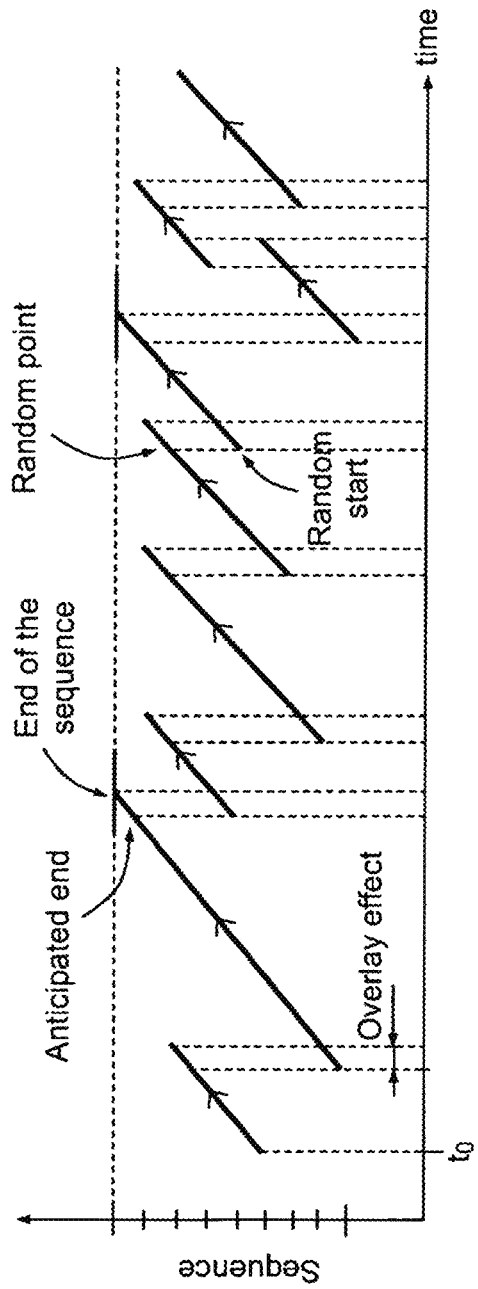
FIG. 16 a simplified graphical illustration showing random overlay playback scenario according to a further embodiment of the present invention.

In another embodiment of the present invention, a video sequence is played back on the Phodeo player device according to the random overlay scenario. As illustrated on FIG. 16, random overlay playback scenario includes playing random pieces of a video sequence. Typically, a first portion of a video sequence is played back and then, a second random portion of the video sequence is played back with an overlay during the transition between the two portions. If the end of a video sequence is about to be reached then it is anticipated in order to start a next portion of the video sequence with enough overlay so that the previous portion of the video sequence does not reach the end of the video sequence. This scenario is suited to contexts where there are some movements in some specific directions, like snowing, waves or cars.

Those skilled in the art will appreciate that these various scenarios which are, for clarity, described in contexts of separate embodiments may also be provided in combination in a single embodiment or in any suitable subcombination.

Figure 17C:
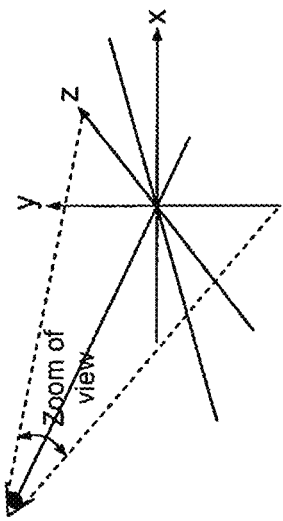
FIGS. 17a, 17b and 17c are simplified graphical illustrations showing how to change point of view, distance and zoom of the layers according to an embodiment of the present invention.
Figure 17B:
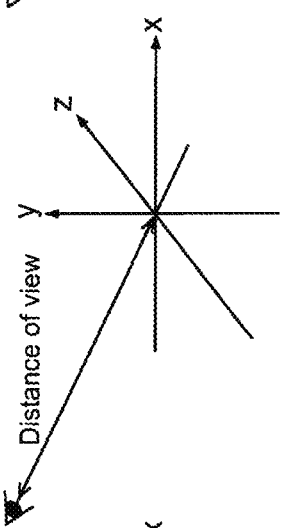
Figure 17A:
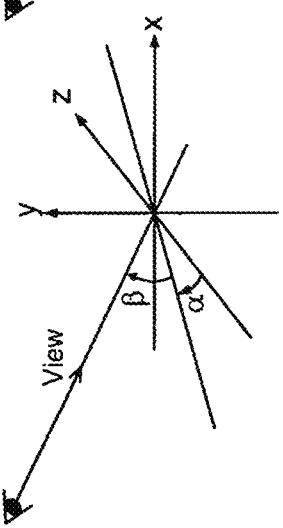

A rendering effect describes how to change the view point while rendering the Phodeo. The rendering effect is typically a dynamic change of all or some parts of:

- a point of view defined by two angles from x and y axis, as illustrated by FIG. 17a. Typically, horizontal and vertical positions of each layer are changed/translated so that the final rendering looks like a change of point of view. To do so, it is to be noted that the translation applied to the background layer is more important than the one applied on the fore layer;
- a distance from the layers for varying perspective, as illustrated by FIG. 17b. To do so, the depth values (and hence the distance between layers) are changed; and
- a zoom in the layers for varying angle of view, as illustrated by FIG. 17c. To do so, it is to be noted that the zoom values/coefficients that are to be applied to the layers are different depending on the position of each layer. For instance, the zoom coefficient of the foreground layer is greater than the zoom coefficient of the background layer.

In an embodiment of the present invention, definition of the effect is controlled by the Phodeo player device on the basis of a few parameters by criteria like moving randomly along horizontal axis at a given speed and between specific angles where axis, speed and angles are defined in the playback guidance. In a further embodiment of the present invention, definition of the effect is defined as a story in the playback guidance, following a scenario as defined for the video sequences. This enables implementation of a lot of different effects.

An example of these effects that can be applied during playback is the Dolly Zoom effect (also known as the "Vertigo" effect—http://en.wikipedia.org/wiki/Dolly_zoom). This effect is obtained by combining zoom and distance in opposite ways.

If the object targeted by the Phodeo capture device is animated by a translation, like a bicycle or a bird flying, the expected Phodeo is the object in the centre and the background unrolling behind. In such a case, angles and distances are adapted to see the object in the foreground at the centre of the scene. This effect includes moving quite quickly between two positions of viewing that corresponds to the theoretical positions of the two eyes in order to create an illusion of 3D.

Each audio sequence is independent or synchronized with a video sequence. If it is synchronized with a video sequence, then it follows the scenario defined for the video sequence. Typically, if people are talking and laughing, sounds of laughing and talking remains synchronized along the different pieces of the video sequence played back with a random mixing scenario. If it is independent, then it can be played back:

- with its own random mixing scenario: playing back random pieces of the audio sequence with overlay between pieces, typically for rendering a specific ambiance; or
- in loop, typically for playing back music.

The Phodeo player device plays back the Phodeo file received from the Phodeo factory module according to the playback guidance in which:

- each video sequence is played back according to a defined scenario;
- each audio sequence is played back according to a defined sound mixing scenario; and
- some effects are applied on the AV sequences.

In a further embodiment of the present invention, the playback guidance is defined so that the Phodeo file can be played out according to a plurality of scenarios for the video sequences, a plurality of effects and a plurality of sound mixing scenarios for the audio sequences. The Phodeo file can therefore be played out for a long time and the final rendering is not the same twice.

Although the above embodiments have been described as being carried out on the Phodeo capture device side and/or on the Phodeo factory device side and/or the Phodeo player device side, someone skilled in the art will appreciate that various features of the invention may be implemented in intermediate components and/or may be deported from a Phodeo device to another Phodeo device.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather the scope of the invention is defined by the appended claims and equivalents thereof.

The invention claimed is:

1. A method for enriching digital photographs, said method comprising a specially programmed physical device performing the following steps:
   receiving a digital photograph and audio video data captured before a time at which said digital photograph is captured until after said time, wherein said audio video data comprises video frames and audio samples;
   processing said digital photograph and said video frames to spatially decompose said digital photograph and said video frames into a plurality of layers;
   processing said audio samples to decompose said audio samples into a plurality of audio sources;
   creating a video layer sequence for each of said plurality of layers, wherein each video layer sequence comprises said processed digital photograph and said processed video frames belonging to a same layer;
   creating a plurality of audio source sequences, wherein each audio source sequence of said plurality of audio source sequences comprises said processed audio samples of a same source,
   defining an order of said plurality of layers;
   generating playback guidance, said playback guidance defining how to combine said video layer sequences during playback and how to combine said audio source sequences with said video layer sequences; and
   transmitting said order, said video layer sequences, said audio source sequences and said playback guidance to a display device for playback.

2. The method according to claim 1, said method further comprising:
   detecting layers that are overlaid by other layers in said plurality of layers;
   detecting transparent areas in said detected layers, said transparent areas corresponding to zones that are overlaid by other layers; and
   filling in said transparent areas.

3. The method according to claim 1, wherein said processing said digital photograph and said video frames comprises:
   detecting edges of a plurality of zones in said digital photograph and said video frames;

clustering zones of said plurality of zones into clustered zones;
superposing said detected edges and said clustered zones, distorting said clustered zones to match said detected edges thereby creating distorted zones; and
decomposing spatially said digital photograph and said video frames into a plurality of layers, each layer comprising at least one distorted zone.

4. The method according to claim 1, wherein said defining an order of said plurality of layers comprises:
receiving metadata related to said digital photograph;
retrieving a depth value of a layer using said metadata, said depth value indicating a depth of a focussed layer in said digital photograph; and
estimating an order of other layers by measuring a degree of focus of layers not focussed in said digital photograph.

5. The method according to claim 1, wherein said defining an order of said plurality of layers comprises:
receiving metadata related to said digital photograph;
retrieving a depth value of a layer using said metadata, said depth value indicating a depth of a focussed layer in said digital photograph; and
estimating depth values of other layers by calculating a size of circle of confusion of layers not focussed in said digital photograph.

6. The method according to claim 1, wherein said defining an order of said plurality of layers comprises retrieving depth values of each layer by calculating a relative displacement of said digital photograph and said video frames with movements of a capture device.

7. The method according to claim 1, wherein said decomposing said audio samples comprises using stereo source decomposition to compare different audio samples and decompose said audio samples into a plurality of audio sources.

8. The method according to claim 7, wherein said decomposing further comprises using an audio goniometric space-transform of said audio samples.

9. The method according to claim 1, wherein said generating playback guidance comprises:
defining at least one playback scenario for each of said video layer sequences wherein a playback scenario defines how to playback a video layer sequence.

10. The method according to claim 9, wherein said playback scenario comprises playing back said video layer sequences for an indefinite duration.

11. The method according to claim 9, wherein said playback scenario comprises switching from playing forward to playing backward when an end of a video layer sequence is reached.

12. The method according to claim 9, wherein said playback scenario comprises switching from playing backward to playing forward when a beginning of a video layer sequence is reached.

13. The method according to claim 9, wherein said playback scenario comprises switching from playing forward to playing backward and vice versa when a randomly generated point of a video layer sequence is reached.

14. The method according to claim 1, wherein said generating playback guidance further comprises:
defining at least one rendering effect wherein a rendering effect defines how to display video layer sequences on a display device.

15. The method according to claim 1, wherein said generating playback guidance further comprises:
defining when to apply a rendering effect according to playback scenarios defined for said video layer sequences.

16. The method according to claim 15, wherein said rendering effect comprises changing horizontal and vertical positions of each layer of said plurality of layers.

17. The method according to claim 15, wherein said rendering effect comprises changing depth value of one or more layers of said plurality of layers.

18. The method according to claim 15, wherein said rendering effect comprises changing zoom value of one or more layers of said plurality of layers.

19. The method according to claim 1, wherein said generating playback guidance comprises defining at least one playback scenario for each of said audio source sequences.

20. The method according to claim 19, wherein said playback scenario comprises playing back at least one audio source sequence synchronized with at least one video layer sequence.

21. The method according to claim 19, wherein said playback scenario comprises playing back at least one audio source sequence independently from video layer sequences.

22. A method for playing back enriched digital photographs, said method comprising:
receiving an order of a plurality of layers, video layer sequences, audio sources sequences and playback guidance according to the method of claim 1; and
playing back said video layer sequences according to said playback guidance on a display device.

23. The method according to claim 22, wherein said playing back said video layer sequences comprises generating at least one random point in said video layer sequences, and switching from playing forward to playing backward and vice versa when a random point is reached.

24. The method according to claim 22, wherein said playing back said video layer sequences comprises generating at least one random point in said video layer sequences, and overlaying a first portion of said video layer sequences currently being played with a second random portion of said video layer sequences when a random point is reached.

25. The method according to claim 22, wherein said playing back said video layer sequences comprises generating at least one random point in said video layer sequences, and overlaying a first portion of said video layer sequences currently being played with a second portion of said video layer sequences when an end of said video layer sequences is reached wherein said second portion is played back from a random point.

26. A non-transitory tangible carrier medium carrying computer readable code for controlling a suitable computer to carry out the method of claim 1.

27. Apparatus comprising a specially programmed physical device for enriching digital photographs, said device comprising:
means for receiving a digital photograph and audio video data captured before a time at which said digital photograph is captured until after said time, wherein said audio video data comprises video frames and audio samples;
means for processing said digital photograph and said video frames to spatially decompose said digital photograph and said video frames into a plurality of layers;
means for processing said audio samples to decompose said audio samples into a plurality of audio sources;
means for creating a video layer sequence for each of said plurality of layers, wherein each video layer sequence comprises said processed digital photograph and said processed video frames belonging to a same layer;

means for creating a plurality of audio source sequences, wherein each audio source sequence of said plurality of audio source sequences comprises said processed audio samples of a same source;

means for ordering said plurality of layers;

means for generating playback guidance, said playback guidance defining how to combine said video layer sequences during playback and how to combine said audio source sequences with said video layer sequences; and means for transmitting said order, said video layer sequences, said audio source sequences and said playback guidance to a display device for playback.

28. A non-transitory tangible carrier medium carrying computer readable code for configuring a suitable computer as the apparatus of claim 27.

29. A device comprising a specially programmed physical device for taking a picture, the device being characterized in that it comprises a capture component that automatically starts capturing audio video data before the picture is taken.

* * * * *